J. CAPRON,

3 Sheets—Sheet 1.

Assignor to J. D. LINCOLN.

ELECTRO MAGNETIC ANNUNCIATOR.

No. 9,946. Reissued Nov. 29, 1881.

Witnesses;

Miller C. Earl

Mel F. Lockwood French,

Inventor,

Jacob Capron, by his Attorney

Frank L. Pope

J. CAPRON,

Assignor to J. D. LINCOLN.

ELECTRO MAGNETIC ANNUNCIATOR.

No. 9,946. Reissued Nov. 29, 1881.

Witnesses;

Miller G. Paul

Mrs. F. Lockwood French.

Inventor,

Jacob Capron, by his Attorney,

Frank L. Pope.

3 Sheets—Sheet 3.

J. CAPRON,

Assignor to J. D. LINCOLN.

ELECTRO MAGNETIC ANNUNCIATOR.

No. 9,946. Reissued Nov. 29, 1881.

Witnesses;

Miller & Earl,

Mrs K. Lockwood French,

Inventor,

Jacob Capron, by his Attorney,

Frank L. Pope

UNITED STATES PATENT OFFICE.

JACOB CAPRON, OF NEW YORK, N. Y., ASSIGNOR TO JAMES D. LINCOLN, OF PLAINVILLE, MASSACHUSETTS.

ELECTRO-MAGNETIC ANNUNCIATOR.

SPECIFICATION forming part of Reissued Letters Patent No. 9,946, dated November 29, 1881.

Original No. 117,979, dated August 15, 1871. Application for reissue filed February 11, 1881.

*To all whom it may concern:*

Be it known that I, JACOB CAPRON, a citizen of the United States, residing in the city, county, and State of New York, have invented certain new and useful Improvements in Electric Signaling Apparatus, of which the following is a specification.

My invention relates to that class of electric signaling apparatus in which visual and audible signals, either or both, are made available to convey certain specific information to an attendant.

The invention relates more specifically to an organization of two or more signaling-circuits converging from different points to a common signal-receiving station, by which arrangement signals may be transmitted from a more or less distant point situated on any of the converging signaling-circuits to an attendant placed at said receiving-station, whose attention may be secured by an alarm, while the particular circuit from which the signal proceeds may be indicated to him at the same time by a visual signaling device.

My invention consists in certain improved methods of operating said signaling mechanism, and of automatically connecting and disconnecting certain portions of the electro-magnetic apparatus by the operation of the signaling mechanism itself.

It further consists in certain novel combinations of the signaling circuits and mechanism, by means of which greater efficiency of action is secured.

As an example of the practical application of my invention, I have hereinafter described my improvements in connection with an annunciator such as is ordinarily employed in hotels and other buildings of similar character.

Figure 1:
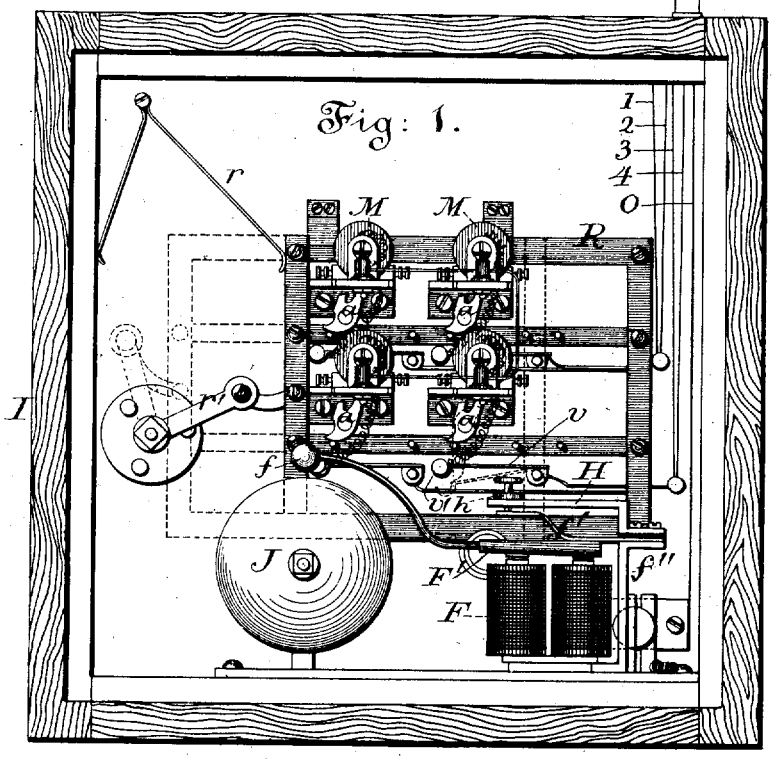
Figure 2:
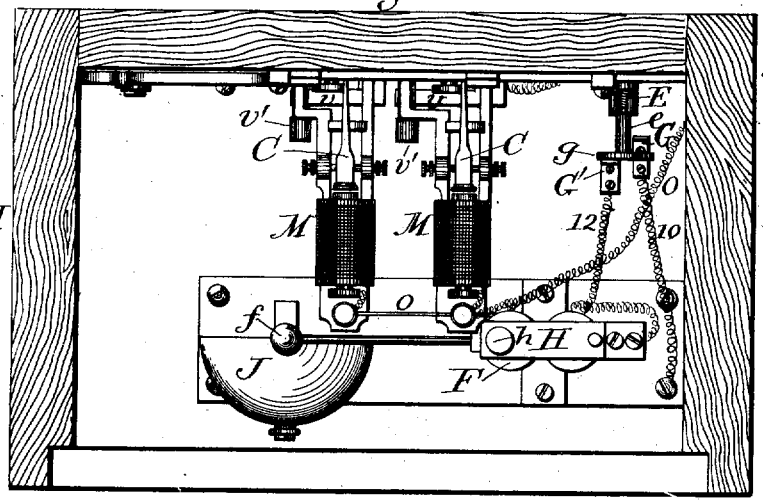
Figure 3:
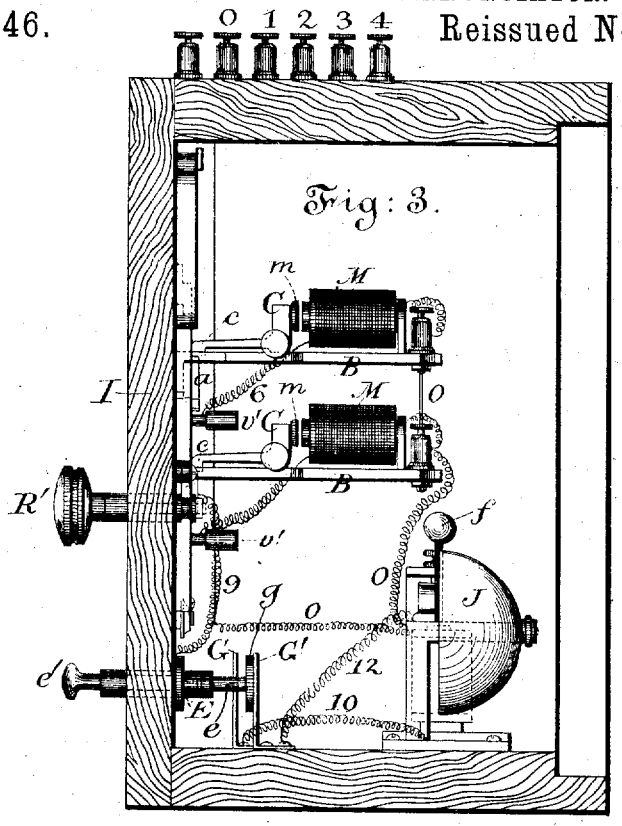

In the accompanying drawings, Figure 1 is a rear elevation, showing the apparatus and mechanism at the central station, the box or case being in section. Fig. 2 is a plan view of the same. Fig. 3 is a side elevation, and Fig. 4 a front elevation, of the same. Figs. 5, 6, 7, 8, and 9 represent detached views of certain portions of the mechanism. Fig. 10 is a theoretical plan, showing the arrangement of the electric circuits.

The apparatus at the central station is inclosed in a box or case, I, upon the front of which is a frame, I′, inclosing a panel or face-plate, P. This plate may be provided with any required numbers or characters designating the different circuits or signaling-points. For example, if the apparatus were intended to be used in a hotel, these characters would designate the different rooms.

In the drawings the apparatus shown is designed for four circuits. The designating numbers or characters of the several circuits are fixed upon the panel P, and are normally concealed by pivoted shields A A A A′, which are mounted upon their pivots so that they may be caused to fall or swing downward in the position shown by the dotted lines, as at A′, for the purpose of exhibiting the characters upon the panel. This movement is effected by mechanism which will be best understood by reference to Figs. 1 and 3.

*a* represents a tumbler, which is affixed to the axis of the shield A and turns with it. This tumbler is provided with a projecting finger, *a′*, (best seen in Fig. 5,) and when the tumbler is in its normal condition, as shown in Fig. 1, with its shield A in a position to conceal its number or character upon the panel P, it rests against the projection *c* upon the long arm of a horizontal lever, C. (See Figs. 2, 3, and 7.) The short arm of the lever C has a soft-iron armature, *m*, attached to it, in a position to be capable of being acted upon by an electro-magnet, M, which is mounted upon a suitable bracket, B, secured to the front of the case I.

Figure 4:
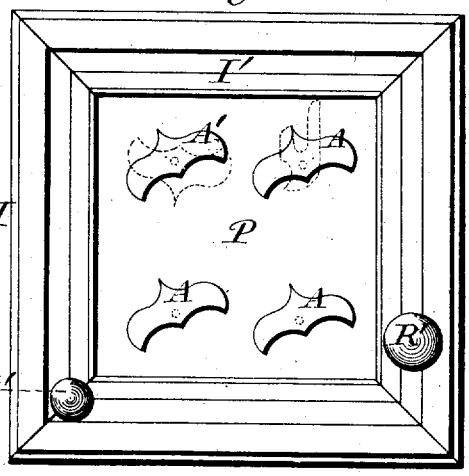
Figure 5:
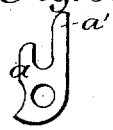
Figure 6:
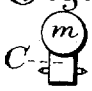
Figure 7:
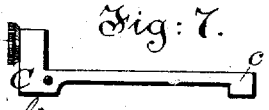

Each of the four shields shown in Fig. 4 is provided with its own tumbler, detent, electro-magnet, and armature, and is capable of being operated independently of the others. Thus it will be understood that if an electric current be sent through one of the electro-magnets M, it attracts its armature *m*, attached to the short end of the lever C, by which means the long arm of the same lever together with its detent *c* is raised. This movement deprives the tumbler *a* of the support against which it normally rests in a position of unstable equilibrium, and it consequently tilts over, making, together with the shield A, nearly one-half of a complete revolution upon its axis in its descent.

F is an independent electro-magnet, which is provided with an armature, F′, hung upon a resilient spring, $f'$. Its armature carries a hammer, $f$, which is arranged to strike against a gong, J, whenever the magnet attracts its armature. The gong J serves as an audible signal to attract the notice of the attendant whenever any one of the visual signals is actuated.

Figure 8:
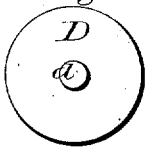

The arrangement of the electric circuits is as follows: Each one of the electro-magnets M M M M is designed to be operated through one of the respective signaling-circuits from a separate signaling point or station. Each signal-station is provided with a circuit closer or key, which I prefer to construct as shown in Figs. 8 and 9.

D is a disk or plate intended to be fastened to a wall or other convenient support.

Figure 9:
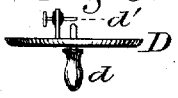
Figure 10:
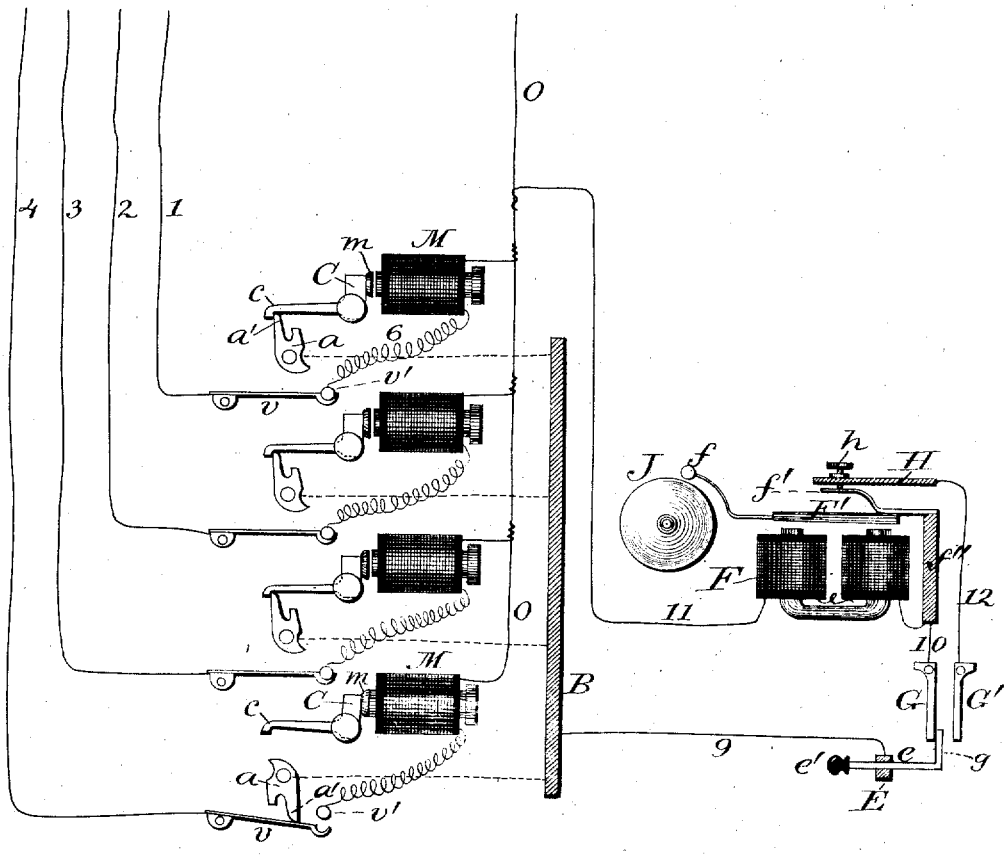

$d$ is a knob or button attached to a pin which passes through an aperture in the disk D, as shown in Fig. 9. The reverse side of the disk D is provided with a stud having an insulated screw, $d'$, to which one of the circuit-wires is connected. The other wire is attached directly to the disk D in any suitable manner.

The circuit is closed, when it is desired to transmit a signal, by pressing in the knob $d$, in which case its pin will touch the screw $d'$ and thus complete the circuit.

The arrangement of the wires is as follows: One main wire, O, is provided, to which is connected one wire of each pair leading from the respective signaling-stations. The other wire of each pair leads to the apparatus at the central station. Thus in Figs. 3 and 10 these four wires, constituting the four signaling-lines from the four independent signaling-stations, are connected to binding-screws on the outside of the case, as shown in Fig. 3, from whence they pass to the signaling mechanism, as shown at 1, 2, 3, and 4 in Figs. 1 and 10. Each one of these wires is arranged in the same manner, and it will therefore be sufficient to describe the connections of one of them. For example, wire No. 1 leads directly to a spring, $v$, which normally presses, by virtue of its own resiliency, against a metallic pin, $v'$. This pin is connected by wire 6, Fig. 3, to one end of the coil of the electro-magnet M, the other end of the coil being connected to the return-wire O common to all the four magnets, and this return-wire is also electrically connected to the remaining wire leading from each of the keys or circuit-closers at the four signaling-stations, as before stated. It will thus be understood that ordinarily the circuit is complete from each of the signaling-stations through the corresponding electro-magnet operating the visual signal at the central station, with the exception of a break at the circuit-closer of the signaling-station. When, therefore, this break is closed upon any wire, the armature of the corresponding electro-magnet is at once attracted and the tumbler released, as hereinbefore explained. In its descent the long finger of the tumbler strikes against the spring $v$ and depresses it, as indicated by the dotted lines in Fig. 1, and also in connection with wire 4 in Fig. 10, thereby interrupting the connection which normally existed between said spring and the pin $v'$. By this means the circuit through the electro-magnet M is broken, while at the same instant a new circuit is formed through the tumbler to the metallic bracket which supports the electro-magnet, from which a wire, 9, leads to the metallic socket E. A metallic pin, $e$, slides horizontally in this socket, having at one end a disk, $g$, which moves between the upright springs G and G', and upon the other end a knob, $e'$, extending outside the case I. When the apparatus is in its normal position the circuit of the wire 9 passes through the socket E and the rod $e$ to the spring G, and thence by the wire 10 to the electro-magnet F, which operates the gong, thence by a wire, 11, which is permanently connected with and forms a branch of the return wire O. Thus it will be understood that when the circuit is closed at any of the signaling-stations the corresponding electro-magnet M is first actuated, causing the corresponding visual signal to be exhibited, and the mechanism which thus exhibits the visual signal immediately afterward interrupts the circuit through its own electro-magnet and forms a new circuit, which includes, in lieu thereof, the electro-magnet of the audible signal.

It is sometimes desirable to have the gong sound a continuous alarm as long as the circuit is closed at the signaling-station. This is effected by means of a spring, $f'$, attached to the armature F' of the electro-magnet of the gong which presses against an adjustable contact-screw, $h$, mounted upon a bracket, H. This arrangement forms an automatic interrupter, which is thrown into circuit at the pleasure of the attendant by pushing in the knob $e$, in which case the connection of the wire 9 is shifted from spring G to the spring G'. The spring G' is connected by the wire 12 with the contact-screw $h$, which touches the spring $f'$, the latter being connected with the electro-magnet F through the frame $f''$, as hereinbefore explained. When the armature is attracted the current is interrupted between the spring $f'$ and the contact-screw $h$, but is automatically restored by the release of the armature, and this operation continues as long as the current passes, causing the gong J to be sounded continuously.

For convenience the sliding rod $e$ is provided with a detent for holding it in position when pushed in, as shown in Fig. 2. The attendant replaces the tumblers and signaling devices in their normal position by means of a sliding rack, R, Fig. 1, which is moved into the position shown by the dotted lines by a crank, $r'$, operated by a handle, R', Fig. 3, on the outside of the case. A spring, $r$, disengages the rack from the tumblers when released by the operator. This device is old, and is not herein claimed.

I claim as my invention—

1. The combination, substantially as hereinbefore set forth, of two or more main signaling-circuits converging to a common signal-receiving station, each of said circuits being provided with, first, a branch circuit normally in electric connection with the main circuit; second, an electro-magnet included in said branch circuit; and, third, a circuit-changer actuated by said electro-magnet when traversed by an electric current from said main circuit, which circuit-changer, when thus actuated, transfers the connection of said main circuit to a normally open return-circuit, which is common to any and all main circuits when thus transferred.

2. The combination, substantially as hereinbefore set forth, of a visual and an audible signal, each actuated by an independent electro-magnet, two independent branch circuits, each including one of the respective electro-magnets, a circuit-changer automatically brought into action by the movement of the visual signal, whereby the actuating-current is diverted from the electro-magnet of the visual signal to the electro-magnet of the audible signal, an automatic circuit-breaker attached to the armature of the electro-magnet of said audible signal, and a switch whereby the current which actuates the audible signal may be made to pass through said automatic circuit-breaker, or not, at the will of the attendant.

3. The combination, substantially as hereinbefore set forth, of two or more main signaling-circuits converging to a common receiving-station, each of said circuits being provided with, first, a branch circuit normally in electric connection with the main circuit; second, a visual signal actuated by an electro-magnet included in said branch circuit; and, third, a circuit-changer actuated directly by the movement of said visual signal, which, when thus actuated, transfers the connection of said main circuit to a normally open return-circuit which is common to any and all the main circuits when thus transferred, and an audible signal operated by an electro-magnet included in said common return-circuit.

In witness whereof I have hereunto set my hand this 27th day of January, A. D. 1881.

JACOB CAPRON.

Witnesses:
AUGUSTUS S. NEWMAN,
MILLER C. EARL.